United States Patent [19]

Barth

[11] Patent Number: 4,534,690

[45] Date of Patent: Aug. 13, 1985

[54] ASSYMETRICALLY SHAPED THREAD FORMING SCREW AND METHOD OF MAKING SAME

[75] Inventor: Gerald D. Barth, South Elgin, Ill.

[73] Assignee: Illinois Tool Works Inc., Chicago, Ill.

[21] Appl. No.: 545,814

[22] Filed: Oct. 26, 1983

[51] Int. Cl.³ ............... F16B 39/30; B21K 1/56
[52] U.S. Cl. .................... 411/386; 411/416; 411/412; 10/10 R; 10/152 T
[58] Field of Search ........ 411/386, 387, 378, 417–421, 411/411, 412, 416, 424–426; 10/10 R, 152 T

[56] References Cited

U.S. PATENT DOCUMENTS

| | | | |
|---|---|---|---|
| 3,180,126 | 4/1965 | Carlson | 10/10 R |
| 3,530,760 | 9/1970 | Lindstrand | 411/416 |
| 3,683,437 | 8/1972 | Larson | 10/10 R |
| 3,850,074 | 11/1974 | Simons | 411/416 |
| 3,878,759 | 4/1975 | Carlson | 10/10 R |
| 4,104,446 | 8/1978 | Johnson | 411/411 |
| 4,368,552 | 1/1983 | Sugiyama | 10/10 R |

FOREIGN PATENT DOCUMENTS 669157  3/1952  United Kingdom ............... 411/417

Primary Examiner—Gary L. Smith
Assistant Examiner—Neill Wilson
Attorney, Agent, or Firm—David I. Roche; Thomas W. Buckman

[57] ABSTRACT

A thread forming screw made from a blank which has a tip with an assymetrical cross-section comprised of two oppositely disposed inner surfaces which gradually merge with two oppositely disposed outer surfaces. The inner surfaces may be arcuate or generally flat or a combination thereof. The inner and outer surfaces are generally parallel to each other and to the axis of the screw so that, when rolled, the tip has generally fully formed sharp crested threads which gradually deform workpiece material upon insertion and axially advancing rotation in a bore. The reduced frictional contact is achieved because of substantial unthreaded portions on the inner surfaces. Improved gripping action results from the formation of full threads which extend substantially the full length of the fastener.

4 Claims, 18 Drawing Figures

ASSYMETRICALLY SHAPED THREAD FORMING SCREW AND METHOD OF MAKING SAME

BACKGROUND AND SUMMARY OF THE INVENTION

The present invention relates to thread forming screws in which threads are formed in a workpiece by plastic deformation. Such screws have applicability in a variety of workpiece materials, but are particularly adapted for use in soft metals and hard plastics. As with many screws, it is desirable that thread forming screws have relatively low driving torque and high stripping torque, because many of these kinds of screws are driven with settable automatically clutched drivers. The operating range of a screw type is defined as the difference between the maximum drive torque and the minimum strip torque. An increased operating range means that a clutch setting can be selected which will result in fewer screws that cannot be driven and fewer screws that will strip. Given the desirability of a large operating range, efforts in the screw art have been directed to decreasing drive torque while at the same time increasing the torque required to strip a screw.

Examples of thread forming screws include tri-roundular screws, as shown in U.S. Pat. Nos. 3,180,126 and 3,195,156. Other examples are shown in U.S. Pat. Nos. 3,218,905 and 3,878,759 which are directed to screws made from blanks having slightly deformed cross-sectionally symetrical tips.

It is an object of the present invention to provide a screw which creates a thread in a workpiece by plastic deformation.

Another object is to provide a thread forming screw which is easily manufactured.

Yet another object is to provide a thread forming screw which has a large operating range.

Still another object is to provide a method of making screws having the above characteristics.

The screw of the present invention is made from a screw having a pinched tip. The cross-sectional shape of the tip is assymetrical in order to create a particularly shaped leading edge which plastically deforms workpiece material without removing material on its way therethrough. By shaping the tip of a screw in accordance with the present invention, frictional contact between the screw and the workpiece is reduced, interference between the leading edge of the threads on the screw and the workpiece is minimized, and portions of the tip contribute to the holding power of the screw.

DETAILED DESCRIPTION OF THE INVENTION

Figure 1:
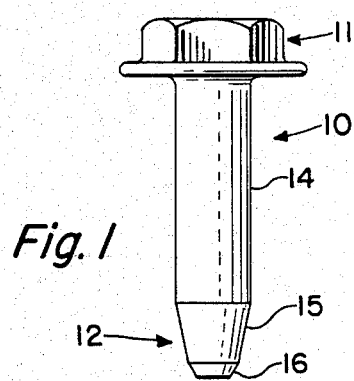
FIG. 1 is an elevational view of a blank of the present invention after a heading operation.
Figure 2:
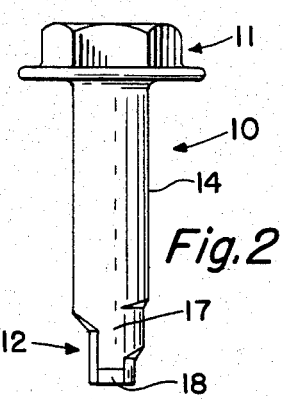
FIG. 2 is an elevational view of a blank of the present invention after a heading and a forging operation.
Figure 3:
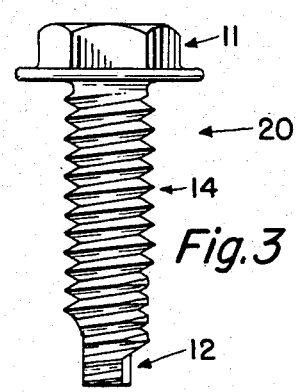
FIG. 3 is an elevational view of a screw of the present invention after a heading, forging and rolling operation.

FIGS. 1, 2, and 3 show the products of the heading, forging and rolling stages of manufacture, respectively, in accordance with the present invention. FIG. 1 shows a headed blank 10 with a head 11 and a tapered tip 12. The blank 10 has a cylindrical shank 14 which has a circular cross-section. The tip 12 has two tapered sections 15 and 16. The upper tapered section 15 has an included angle somewhat less than the lower tapered section 16. This is done so that when the tip is forged into the shape shown in FIG. 2, the upper taper is substantially eliminated on the outer portions 17 of the upper part of the tip, and those outer portions become substantially aligned with the shank 14. The forging operation which produces the blank of FIG. 2 does, however, leave a tapered outer surface 18 on side portions of the forged tip 12. The basic purpose, however, of the forging operation is to create a tip 12 having a geometry which when rolled is capable of thread forming. FIG. 3 is a view of the final rolled screw 20.

Figure 4:
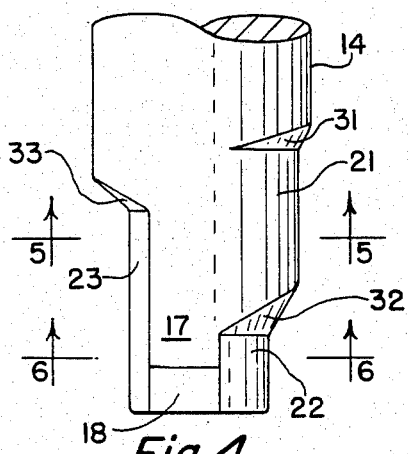
FIG. 4 is an enlarged elevational view of the tip of the blank shown in FIG. 2.
Figure 5:
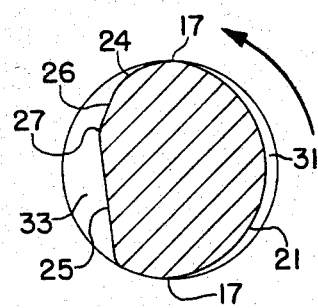
FIG. 5 is a sectional view taken along line 5—5 in FIG. 4.
Figure 6:
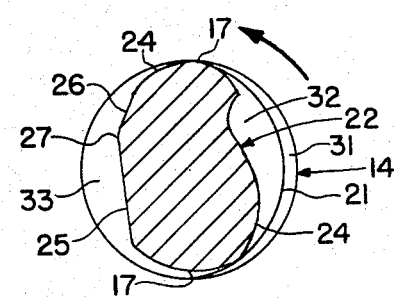
FIG. 6 is a sectional view taken along line 6—6 in FIG. 4.
Figure 7:
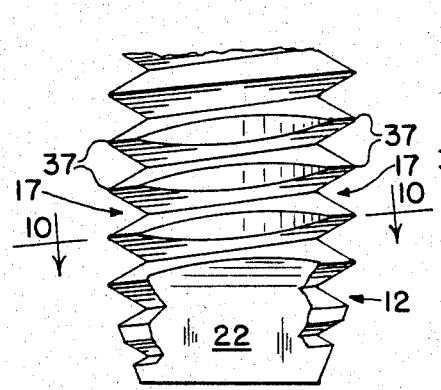
FIGS. 7, 8 and 9 are elevational views of the tip of the screw shown in FIG. 3.
Figure 8:
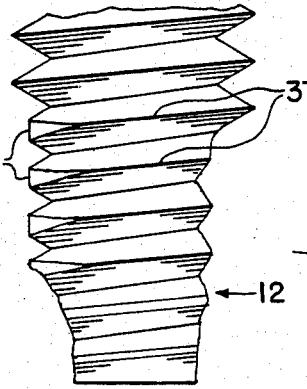
Figure 9:
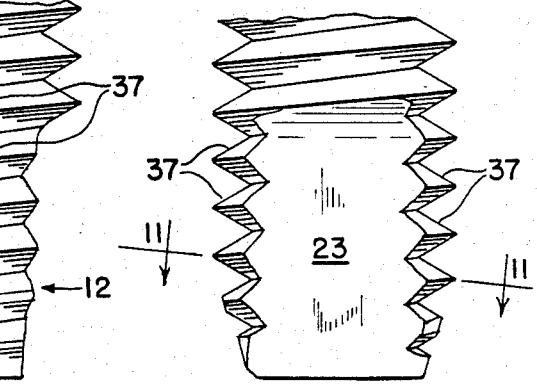

FIGS. 4, 5, and 6 show the geometry of the tip 12. The elevational view of FIG. 4 shows the reduced transverse dimension of the tip 12. The outer surfaces 17 and 18 merge with inner surfaces 21, 22, and 23. The shapes of the inner surfaces are shown more clearly by cross-sectional views 5 and 6. The longer inner surface 23 is comprised of two generally planar surfaces 25 and 26, planar surface 26 being generally smaller in lateral dimension than planar surface 25. Surfaces 25 and 26 join at a protruding rounded intersection 27. Surfaces 26 and 17 are joined by a curved head surface 24 which provides a gradual transition to full diameter at outer surface 17. Similarly, lower inner surface 22 has a lead surface 29 which provides a gradual transition from substantially less than full diameter to full diameter at outer surface 17. Lower inner surface 22, however, unlike longer inner surface 23, is generally non-planar and S-shaped. The upper inner surface 21 is generally semi-elliptical and less blank material is displaced in this area. It should be noted that only the small tapering transition surfaces 31, 32, and 33 and 18 are at an angle with the axis. A large majority of the surface area, namely surfaces 17, 21, 22, and 23, of the tip 12 is generally parallel to each other and to the axis of the screw.

It should be noted that in this specification, the terms "leading edge" and "lead surface" refer to that portion of the screw, and corresponding portions of the blank, which make initial thread forming contact with the walls of a bore in a workpiece when the screw is advanced. Also, in the drawings, the various unnumbered arrows indicate the direction of rotation (prospective in the case of the blanks) to achieve axial advancement.

FIGS. 7 through 11 are various views of the finally formed screw of the present invention. The tip 12 has no threads at all on portions of inner surfaces 22 and 23, and partial threads 38 formed on upper inner surface 21 and tapered surface 18. The thread rolled screw tip 12 has generally sharp crested threads 37 formed on outer surfaces 17.

Figure 10:
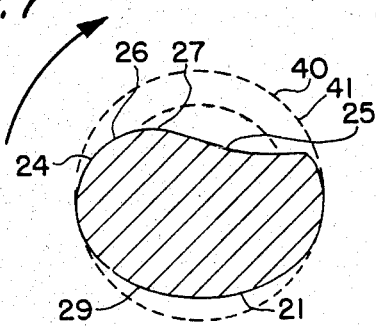
FIG. 10 is a sectional view taken along line 10—10 in FIG. 7.
Figure 11:
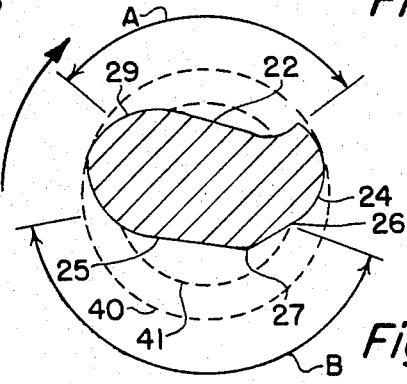
FIG. 11 is a sectional view taken along line 11—11 in FIG. 9.
Figure 12:
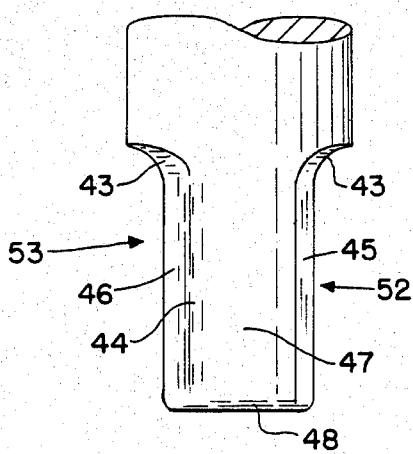
FIG. 12 is an enlarged elevational view of the tip of a blank of a first alternative embodiment of the present invention.
Figure 13:
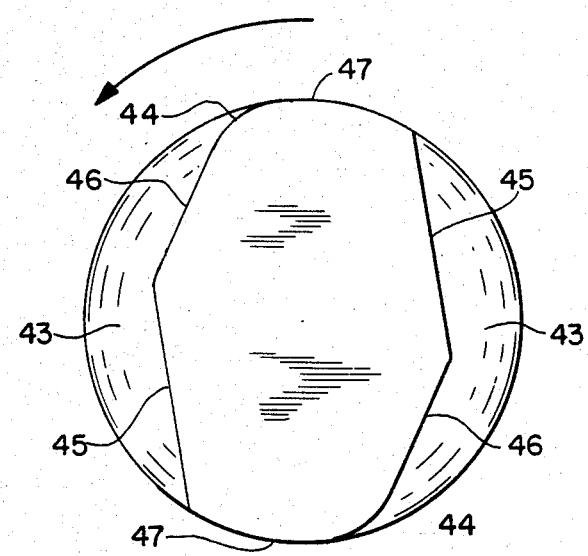
FIG. 13 is an end view of the tip shown in FIG. 12.

FIGS. 10 and 11 show the lead surfaces 24 and 29 which exist after thread rolling. The gradual transition to full diameter provided by lead surfaces 24 and 29 means that plastic deformation of a workpiece is achieved with a minimum amount of drive torque. Furthermore, since the threads 37 are formed from substantially full diameter portions 17, the threads 37 are sharp crested. By forming threads in a workpiece with sharp crested threads, more effective plastic deformation is possible.

After the sharp crested threads 37 begin the thread forming operation, partially formed threads 38 act as a burnishing thread to smooth parts of the thread formed in the workpiece. And, since the threads 38 are only partially formed, frictional resistance is less than that of a fully formed full crested thread. The action of threads 38, however, only begins after the action of threads 37 is well under way. The dotted circles 40 and 41 represent the crest and root diameters respectively of threads on the shank 14.

A significant feature of the present invention is that in the lower portion of the tip 12 of the screw 20, there is a substantial absence of contact between tip 12 and the workpiece. This is represented by the sum of radial extent A and B. It is the large amount of deformation of the blank tip which allows a substantial majority of the radial extent of the tip to be out of contact with a workpiece when at the same time full diameter threads are performing a thread forming operation.

Figure 14:
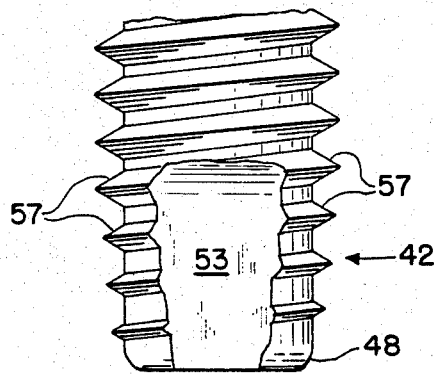
FIGS. 14 and 15 are enlarged elevational views of the tip of a screw made from the forged blank shown in FIGS. 12 and 13.
Figure 15:
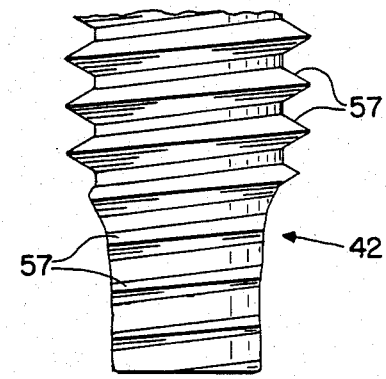

Another significant benefit of the present invention is the creation of fully or nearly fully formed threads 37 which extend almost the entire length of the tip 12. This allows either a greater grip length in which the threads 37 can be used by themselves, or an increased strip torque in more fully threaded workpieces. It should be noted that the surfaces 17 of the tip are intended to be separated by a diametral dimension corresponding to that of the blank diameter of the shank in order to allow the formation of the fully formed threads 37 having crest diameter substantially equal to the crest diameter of threads on the shank 14. Alternatively, however, a thread rolling die may be used which creates a slight taper in the crests of threads on the tip as can be seen in FIG. 14.

FIGS. 12 through 15 depict a second embodiment of the present invention. In this embodiment, the tip 42 has inner surfaces 52 and 53 which correspond to each other and to surface 23 in FIGS. 4, 5, and 6. In this embodiment, 52 and 53 are each comprised of two generally planar surfaces, a laterally larger surface 45 and a laterally smaller surface 46. These surfaces 44, 45 and 46 correspond in function and structure to surfaces 24, 25 and 26 in FIGS. 4, 5, and 6 discussed above.

Similarly, surfaces 43, 47 and 48 correspond to surfaces 33, 17 and 18 respectively of FIGS. 4, 5, and 6 in both structure and function. Surfaces 47 are separated by a full blank diameter in order that fully formed sharp crested threads 57 can be formed in a thread rolling operation.

Figure 16:
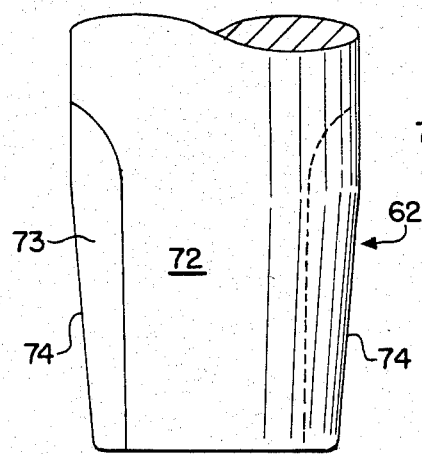
FIG. 16 is an enlarged elevational view of a tip of a forged blank of a second alternative embodiment of the present invention.
Figure 17:
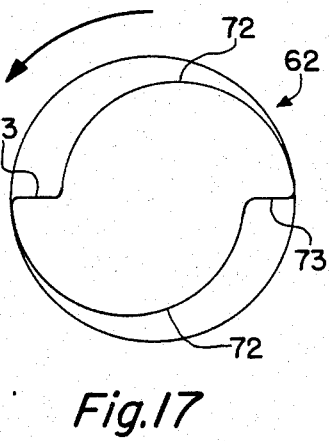
FIG. 17 is an end view of the tip shown in FIG. 16.
Figure 18:
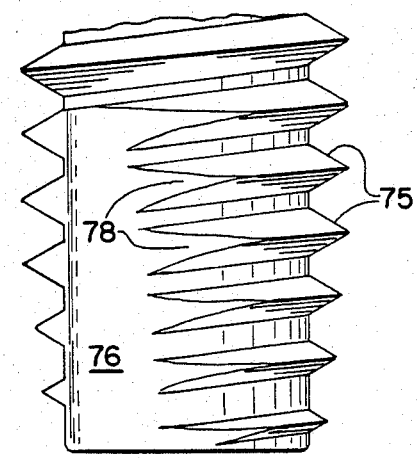
FIG. 18 an enlarged elevational view of the tip of a screw made from the blank shown in FIGS. 16 and 17.

FIGS. 16 through 18 show a third embodiment of the present invention. FIGS. 16 and 17 show a forged tip 62 comprised of generally parallel axially oriented and continuously curved spiral surfaces 72. These surfaces correspond in shape and function to surface 22 of the first embodiment. These surfaces 72 each intersect end surfaces 73. There is a gradual transition from a reduced transverse dimension to a substantially full diameter. Again in this embodiment, as in the first and second, the forged tip is assymetrical with respect to any plane containing the axis of the screw.

FIG. 18 shows the effect of thread rolling the forged tip 62. Partially formed threads 78 are formed on intermediate portions of spiral surfaces 72, while fully formed threads 73 are formed on outer portions thereof. As in the first two embodiments, the screw of the third embodiment has a pair of unthreaded portions 76 and two portions having fully formed sharp crested threads. In this embodiment, the tip has tapered end edges 74 which when rolled result in a taper in the crests of threads 73. This is to facilitate insertion of the screw into a bore. It should be noted that the taper extends only partially up the tip, and that full blank diameter is reached in the tip at upper locations thereof, and that, as a result, the crest height of threads 75 on the upper part of the tip is substantially equal to the crest height of threads formed on the shank of the screw.

It should also be noted that while in the above described embodiments a separate forging operation is preferred in order to achieve significant displacement of material, it is conceivable that a heading operation could be performed which would result in a screw having the characteristics of the present invention. For some applications where the workpiece material is suitable, it may be desirable from a production cost standpoint to eliminate the separate forging operation at the possible sacrifice of product versatility due to less extensive material displacement in the tip.

While the embodiments shown herein include tips having indentations which result in a plurality of generally axial and generally parallel tip surfaces, it is possible that at least some of the tip surfaces could be tapered. However, it is preferable that at least the outer tip surfaces generally be aligned with the shank surfaces so that at least some fully formed full crested threads may be formed on the tip.

While the invention has been described in terms of specific embodiments, it is clear that numerous alternatives, modifications, and substitutions will be apparent to one having ordinary skill in the art. It is, therefore, intended that such alternatives, modifications, and substitutions be included within the spirit and scope of the appended claims.

I claim:

1. A thread forming fastener comprising a generally cylindrical shank with a head at one end and a tip at the other end, said tip having a generally asymmetrical cross-sectional shape with a pair of outer lead surfaces having blunt generally rounded shape, and said tip having a substantially fully formed and interrupted thread formed thereon, said tip including a pair of diametrically oppositely disposed indented inner surfaces intermediate said lead surface, one of said inner surfaces being comprised of a pair of generally flat parallel axially oriented surfaces, and one of said inner surfaces being generally arcuate and spiral in cross-section and generally parallel with said flat surfaces, said thread extending over a major portion of the length of said tip and continuing uninterruptedly at a constant pitch on at least a portion of said shank.

2. A thread forming fastener comprising a generally cylindrical shank with a head at one end and a tip at the other end, said fastener having at least one helical thread extending from at least a portion of said shank on to said tip, said tip including two diametrically opposite threaded outer surfaces and two diametrically opposite unthreaded inner surfaces, said inner surfaces having substantially different axial lengths, at least a portion of each of said inner surfaces gradually increasing in radial dimension and merging with one of said outer surfaces to form partially threaded lead surfaces having generally rounded cross-sectional shape, said threaded outer surfaces including a sharp crested thread, at least a portion of which is substantially equal in radial crest dimension to that of threads formed on said shank, said tip including a third inner surface axially adjacent one of said unthreaded inner surfaces, said third inner surface having partially formed threads disposed thereon.

3. A fastener according to claim 2 wherein said third inner surface is generally elliptical in cross-section, one of said opposite inner surfaces is arcuate and spiral in cross-section and the other of said opposite inner surfaces is comprised of two generally flat surfaces, one of said flat surfaces being greater in lateral dimension than the other.

4. A fastener according to claim 2 wherein said inner surfaces are generally parallel to each other and to the axis of said fastener.

* * * * *